United States Patent
Ferri et al.

(10) Patent No.: US 11,136,218 B2
(45) Date of Patent: Oct. 5, 2021

(54) METHOD FOR FASTENING A RAIL OF AN ELEVATOR SYSTEM IN AN ELEVATOR SHAFT

(71) Applicant: Inventio AG, Hergiswil (CH)

(72) Inventors: Emanuele Ferri, Mettmenstetten (CH); Torsten Sonner, Ebikon (CH); Peter Möri, Rothenburg (CH)

(73) Assignee: INVENTIO AG, Hergiswil NW (CH)

( * ) Notice: Subject to any disclaimer, the term of this patent is extended or adjusted under 35 U.S.C. 154(b) by 172 days.

(21) Appl. No.: 16/491,749

(22) PCT Filed: Mar. 22, 2018

(86) PCT No.: PCT/EP2018/057263
§ 371 (c)(1),
(2) Date: Sep. 6, 2019

(87) PCT Pub. No.: WO2018/177870
PCT Pub. Date: Oct. 4, 2018

(65) Prior Publication Data
US 2020/0031622 A1    Jan. 30, 2020

(30) Foreign Application Priority Data
Mar. 28, 2017 (EP) ..................................... 17163212

(51) Int. Cl.
*B66B 7/02* (2006.01)
*F16B 2/12* (2006.01)
*E01B 9/66* (2006.01)

(52) U.S. Cl.
CPC ................ *B66B 7/024* (2013.01); *E01B 9/66* (2013.01); *F16B 2/12* (2013.01)

(58) Field of Classification Search
CPC ....................................................... B66B 7/024
See application file for complete search history.

(56) References Cited

U.S. PATENT DOCUMENTS

| 3,199,642 A | * | 8/1965 | Anderson | B66B 7/02 187/408 |
| 4,728,031 A | * | 3/1988 | Heim | E01B 9/40 211/86.01 |
| 6,305,615 B1 | * | 10/2001 | Traktovenko | B66B 7/02 187/408 |

FOREIGN PATENT DOCUMENTS

| CH | 652773 A5 | * 11/1985 | ............... E01B 9/46 |
| CN | 201077703 Y | 6/2008 | |
| CN | 202785167 U | 3/2013 | |
| CN | 105905750 A | 8/2016 | |

(Continued)

*Primary Examiner* — Minh Truong
(74) *Attorney, Agent, or Firm* — William J. Clemens; Shumaker, Loop & Kendrick, LLP

(57) ABSTRACT

A method for fastening a rail of an elevator system to a bearing element fixed in an elevator shaft utilizes a clamp set having a clamp and a spacer. The clamp is arranged on a side part of a rail foot arranged on the bearing element whereby the clamp connects to the bearing element in a fastening zone of the clamp and a contact zone of the clamp is situated on a bearing side on an upper face of the side part. The spacer defines a mounting distance between the contact zone and the bearing side such that the clamp is partly elastically and plastically deformed in the fastening zone when connected. The spacer is then at least partially removed so that a distance between the contact zone and the bearing side is reduced.

12 Claims, 5 Drawing Sheets

(56) References Cited

FOREIGN PATENT DOCUMENTS

| | | | | |
|---|---|---|---|---|
| CN | 205892408 U | 1/2017 | | |
| EP | 0448839 A1 | 10/1991 | | |
| EP | 3556706 A1 * | 10/2019 | ............ | B66B 7/024 |
| ES | 2421083 A1 | 8/2013 | | |
| FR | 2621619 A1 * | 4/1989 | ............ | E01B 9/303 |
| GB | 2043590 A | 10/1980 | | |
| JP | 2000302354 A * | 10/2000 | ............ | B66B 7/024 |
| JP | 2004536002 A | 12/2004 | | |
| JP | 5350062 B2 | 11/2013 | | |
| WO | 9015009 A1 | 12/1990 | | |
| WO | WO-03011736 A1 * | 2/2003 | ............ | B66B 7/024 |
| WO | WO-2013140673 A1 * | 9/2013 | ............ | B66B 7/024 |
| WO | WO-2017093777 A1 * | 6/2017 | ............ | B66B 7/024 |

\* cited by examiner

METHOD FOR FASTENING A RAIL OF AN ELEVATOR SYSTEM IN AN ELEVATOR SHAFT

FIELD

The invention pertains to a method for fastening a rail of an elevator system in an elevator shaft, a clamp set for fastening a rail of an elevator system in an elevator shaft and an elevator system that is installed in an elevator shaft.

BACKGROUND

ES 2 421 083 A1 discloses a rail foot holder, in which a lateral part of an element presses on an upper face of a side part of the rail foot in the mounted state. In this case, the lateral part is arranged on one side of a fastening axis for the element whereas an elastic material that supports the element is located on the other side of the fastening axis. A screw is tightened along the fastening axis, wherein a head of the screw presses on the element such that the pressing force for holding the rail foot is on the one hand exerted via the lateral part and the element is on the other hand held in contact with the elastic material. If the lateral part of the element is now raised by the upper face of the side part of the rail foot, an increasing compression of the elastic material takes place, wherein a corresponding pivoting function is realized due to the design and interaction of the head of the screw with the element.

The design known from ES 2 421 083 A1 has the disadvantage that a respective motion or pivoting motion of the element about the stationary head is required for realizing the pivoting function, wherein a static or kinetic friction respectively has to be overcome between the element and the head. Consequently, the desired holding force or spring force can only be insufficiently specified by means of the elastic material. Furthermore, the elastic material may lose its functional capability due to component aging. Another problem during the installation can be seen in that the force for tightening the screw has to be exerted in a precisely metered manner, wherein the elastic material is at risk of being overloaded if the screw is inadvertently overtightened.

Elevator systems are typically installed in buildings. Rails, particularly guide rails, are fastened on a building wall in this case and extend over the entire traveling distance of the elevator, which frequently corresponds to about the height of the building. Particularly guide rails have to be fastened in the building so firmly that they can reliably absorb guiding forces of the type occurring, for example, while guiding an elevator car or a counterweight. However, the building height changes over time, particularly in a newly erected building. For example, the building shrinks after its completion as a result of drying and settling. However, the building height may also vary due to temperature changes and insolation.

Variations of the building height, which occur after the completion of the respective building or elevator system, cause mechanical forces in the guide rails such that a shift of the correspondingly fastened guide rails relative to the building takes place. If the building shrinks, for example, the guide rails expand in relation to the building. In order to prevent the deformation of rail sections, the fastening points of the respective guide rail have to be designed in such a way that a length compensation with respect to a varying distance between fastening points is realized. However, sufficient fastening for absorbing forces, particularly guiding forces, simultaneously has to be ensured at the fastening points.

SUMMARY

The invention is based on the objective of disclosing an enhanced method for fastening a rail of an elevator system, an enhanced clamp set for fastening a rail of an elevator system and an advanced elevator system. In this respect, the invention particularly aims to allow an enhanced installation and/or an enhanced specification of a fastening force acting at a fastening point of the rail.

Embodiments and proposals for a corresponding design, which concern a method for fastening a rail of an elevator system, a clamp set for fastening a rail of an elevator system and an elevator system and at least partially attain the above-defined objective, are disclosed below. Furthermore, advantageous supplementary or alternative enhancements and embodiments are respectively disclosed and described.

According to an embodiment, a method for fastening a rail of an elevator system on at least one bearing element, which is fixed in an elevator shaft, by means of at least one clamp set comprising a clamp and a spacer can be realized, wherein the clamp is arranged on a side part of the rail foot of the rail, which is arranged on the bearing element, in such a way that the clamp can be connected to the bearing element in a fastening zone of the clamp and that a contact zone of the clamp is arranged on a bearing side on an upper face of the side part of the rail foot, wherein a mounting distance between the contact zone of the clamp and the bearing side on the upper face of the side part of the rail foot can be specified by means of the spacer in such a way that the clamp is in part elastically and in part plastically deformed when the clamp is connected to the bearing element in its fastening zone, and wherein the spacer is at least partially removed and/or designed in such a way that a distance between the contact zone of the clamp and the bearing side on the upper face of the side part of the rail foot is at least reduced relative to the mounting distance at least over the course of time.

"At least reducing" the distance between the contact zone of the clamp and the bearing side on the upper face of the side part of the rail foot relative to the mounting distance at least over the course of time includes instances, in which the mounting distance is reduced to zero, for example when the spacer is removed.

According to another embodiment, a clamp set for fastening a rail of an elevator system on at least one bearing element fixed in an elevator shaft can be realized, wherein the clamp set comprises a clamp and a spacer, wherein the clamp is provided with a fastening zone and a contact zone in such a way that it can be arranged on a side part of the rail foot of the rail, which is arranged on the bearing element, connected to the bearing element with its fastening zone and arranged on a bearing side on an upper face of the side part of the rail foot with its contact zone, wherein the spacer is designed such that a mounting distance between the contact zone of the clamp and the bearing side on the upper face of the side part of the rail foot can be specified by means of this spacer in such a way that the clamp can be in part elastically and in part plastically deformed when the fastening zone is connected to the bearing element, and wherein the spacer can be at least partially removed or is designed in such a way that a distance between the contact zone of the clamp and the bearing side on the upper face of the side part of the rail foot respectively is or can in the mounted state be reduced relative to the mounting distance at least over the course of time. In other words, the spacer is in this embodiment realized in such a way that the distance between the contact zone of the clamp and the bearing side on the upper face of the side part of the rail foot is reduced relative to the mounting distance over the course of time.

The proposed clamp set serves for fastening a rail of an elevator system in an elevator shaft, wherein a plurality of such clamp sets is preferably used. In this case, the entire clamp set or parts thereof may form part of the elevator system. However, the rail and the bearing element do not form parts of the inventive clamp set and the clamp set may also be manufactured and distributed independently thereof.

According to yet another embodiment, an elevator system with at least one rail can be realized, wherein said rail is mounted in an elevator shaft with the above-described method. In such a method, the rail can be advantageously mounted by means of at least one clamp set. However, components of the clamp set, particularly the spacer, may already be removed again when the elevator system is commissioned. During its operation, the elevator system therefore does not necessarily comprise all components of the clamp set that were used during the installation.

A rail (elevator rail) of an elevator system typically consists of multiple rail sections, which are joined to one another along their longitudinal direction, for example, during the installation of the elevator system in order to jointly form the rail in the installed state. Each of the rail sections preferably is mounted in the elevator shaft by means of one or more of the proposed clamp sets. In this case, the installation in the elevator shaft may be realized on a wall of the elevator shaft by means of the bearing element. However, other options such as mounting the bearing element on a suitable support structure would also be conceivable. Furthermore, a bearing element may serve for multiple clamp sets, particularly for two clamp sets that fasten the rail foot on opposite locations on its two side parts. In this case, additional elements and/or components can be mounted during the installation. For example, the rail may be placed on the spacer directly or by means of an anti-friction layer. Furthermore, an intermediate layer may also be provided additionally or alternatively to such an anti-friction layer. The clamp set can be adapted to such additional layers, particularly an anti-friction layer or intermediate layer. However, an intermediate layer may also serve for adapting the rail foot to a specified installation condition.

Furthermore, additional elements, particularly spacer elements such as washers or intermediate washers, may also be installed with respect to the spacer. The mounting distance between the fastening zone of the spacer and the bearing element can be optionally adapted to the installation conditions by means of such elements.

Consequently, different adaptations of the disclosed method, the disclosed clamping set and the disclosed elevator system can be realized, wherein said adaptations make it possible to suitably fasten the rail in the elevator shaft for the respective application. This results in a broad range of applications for the proposed solutions.

An enhanced adjustment with respect to a zero-clearance fastening of the rail can be advantageously realized during the installation of the elevator system by means of the at least one clamp set. This makes it possible to compensate manufacturing tolerances of the rail, which may particularly concern a material thickness of the rail foot. The compensation of manufacturing tolerances of the rail at least includes a reduction of an influence of the manufacturing tolerances on fastening forces of the rail. For example, the material thickness of the rail foot may fluctuate from rail section to rail section. When such rail sections are joined to one another during the installation in order to form the rail extending through the elevator shaft, the required holding dimension can be individually adjusted for the respective rail section. In this case, it is advantageous that a narrow variation range for the individually realized clamping force also results at different holding dimensions. This correspondingly reduces the variation range for frictional forces, which are relevant with respect to the desired length compensation between the rail and the building. A comparatively narrow variation range of the realized clamping forces around a nominal value for the clamping force particularly can be ensured by using a plurality of clamp sets. In this way, the optionally required minimal clamping force can be reliably ensured and a desired length compensation behavior can be realized.

It is advantageous that a tolerance range for a nominal holding dimension specified between the bearing side on the upper face of the side part and the bearing element for the side part of the rail foot is defined and that the mounting distance specified by means of the spacer shifts the defined tolerance range for the nominal holding dimension into a flatly extending region of a deformation curve of the clamp. The nominal holding dimension can be defined for the respective application. For example, the nominal holding dimension between the upper face of the side part and a bottom face of the side part may be defined for a typically ideal rail foot. In this respect, the important aspect is the tolerance range. The tolerance range (total tolerance range) preferably should take into account all relevant tolerances during the installation of the bearing element. In this respect, the nominal holding dimension should also include other optionally provided layers, particularly an anti-friction layer and/or an intermediate layer, if such layers have other relevant effects on the tolerance range. For example, manufacturing-related tolerances other than manufacturing-related variations in the design of the rail foot can thereby also be taken into account.

The bearing side on the upper face of the side part does not necessarily correspond to the upper face of the side part. An anti-friction layer, for example in the form of a coating of the upper face of the side part, particularly may be provided on the upper face of the side part, wherein the bearing side is realized on said coating in this case. Potential tolerances of such an anti-friction layer are also included in the tolerance range.

It is likewise advantageous that the tolerance range for the nominal holding dimension is determined at least from a constructively specified and/or empirically determined tolerance range for the side part of the rail foot and optionally from a constructively specified and/or empirically determined tolerance range between the bearing side on the upper face of the side part of the rail foot and the upper face of the side part of the rail foot. For example, the tolerance range between the bearing side on the upper face of the side part and the upper face of the side part may be a result of the aforementioned anti-friction layer. At least one additional tolerance range may result from an intermediate layer and/or an anti-friction layer, which may be arranged between the bottom face of the rail foot and the bearing element during the installation of the rail if so required in the respective application. Furthermore, an additional tolerance range may also result between the contact zone of the clamp and the bearing element if additional elements, particularly intermediate washers or washers, are used at this location.

An empirical determination of the relevant tolerance range for the nominal holding dimension is particularly advantageous because smaller tolerances frequently occur during the manufacture.

A constructively specified tolerance range may be defined, for example, based on a suitable standard whereas the manufacturing-related fluctuations are relevant for the installation. According to ISO-Standard ISO 7465, for example, the thickness dimensions of the rail foot may have a tolerance of +/−0.75 mm. With respect to the construction or standard, a tolerance range for the nominal holding dimension of 1.5 mm would therefore have to be taken into account in extreme instances. However, deviations outside a bandwidth of +/−0.5 mm, which corresponds to a tolerance range of 1 mm, rarely occur in practical applications. The tolerance range can then be empirically determined, for example, as being 1 mm or less. Since the mounting distance specified by means of the spacer preferably is at least defined with respect to the certain tolerance range for the nominal holding dimension, a sufficient empirical determination, which allows an adequate adaptation during the installation, can be realized, for example, by choosing a corresponding tolerance range of 1.0 mm.

It is advantageous that the bearing side on the upper face of the side part of the rail foot is respectively chosen or specified as the upper face of the side part of the rail foot. In an alternative embodiment, an anti-friction layer may be provided or installed, wherein said anti-friction layer is arranged on the upper face of the side part of the rail foot and advantageously specified or chosen as bearing side on the upper face of the side part of the rail foot. It is therefore possible to conceptually distinguish between the bearing side on the upper face of the side part of the rail foot. In this context, the bearing side specifies the location, on which the contact zone of the clamp ultimately abuts when the spacer is removed as long as a complete removal of the spacer is realized. Depending on the embodiment of the method or the clamp, the spacer may directly abut on the bearing side on the upper face of the side part of the rail foot when the spacer is installed. In a potential alternative embodiment, however, the spacer may also be recessed exactly at the location, on which the contact zone of the clamp abuts on the bearing side when the spacer is removed. In this case, the spacer can abut on the bearing side at least in a vicinity of the thusly specified contact point in order to carry out the installation. Consequently, the bearing side may in a potential embodiment lie in the upper face of the side part of the rail foot whereas the bearing side is in another potential embodiment spaced apart from the upper face of the side part of the rail foot, for example due to an anti-friction layer located on the upper face of the side part.

In a potential embodiment, it is advantageous that the spacer preferably is removed immediately after the clamp has been connected to the bearing element in its fastening zone. In this case, the installation process may comprise, for example, the following three steps. In a first step, the spacer is arranged between the contact zone of the clamp and the bearing side on the upper face of the side part. In a second step, the clamp is fastened in its fastening zone, for example by means of a screw, wherein the screw is tightened to its limit. In a third step, the spacer is removed or at least relaxed, wherein the removal may be optionally simplified or realized by at least partially loosening the screw temporarily. A relaxation can be achieved, for example, if a screw is used as the spacer. The spacer may optionally also be removed at a later time, but at least prior to the commissioning or recommissioning of the elevator system.

In another potential embodiment, it is advantageous that the spacer remains at least partially installed after the clamp has been connected to the bearing element in its fastening zone and at least during the commissioning or recommissioning of the elevator system, wherein the spacer is made of such a material that the at least partially installed spacer has a creep behavior during the operation. In this case, it is furthermore advantageous that the spacer is made of a material that acts in a friction-reducing manner with respect to a motion of the rail foot relative to the bearing element and the clamp connected to the bearing element. After the commissioning or recommissioning of the elevator system, the spacer, which still is at least partially installed during the operation, initially causes an increased clamping force that in itself results in an increase of the frictional forces occurring during a lengthy compensation. However, the choice of a friction-reducing material for the spacer acts in itself in a friction-reducing manner such that the effect of the increased clamping force can be at least partially compensated. Due to the creep behavior of the material, the contact zone of the clamp then approaches the bearing side on the upper face of the side part such that the clamping force is reduced and potentially required length compensations are simplified. The advantage of this solution can be seen, among other things, in the elimination of one installation step.

The clamp preferably is designed in such a way that it can plastically deform in certain regions or zones during the installation whereas such a plastic deformation does not occur in other regions or zones. It is particularly advantageous if the fastening zone and a lateral zone, which can serve, e.g., for laterally guiding the rail foot, are at least in essence not plastically deformed when the clamp is connected to the bearing element during the installation. However, this does not preclude the possibility of realizing a side of the fastening zone that faces the bearing element in a structured manner in order to additionally secure the clamp against turning relative to the bearing element about a fastening axis during tightening. Potential plastic deformations, which are limited to regions near the surface and do not affect the clamping force, are considered negligible for the relevant function of the clamp. If at least one additional mounting element, particularly a washer, is used between the fastening zone of the clamp and the bearing element, for example, such a mounting element could also be realized with structured sides or surfaces, which are at least slightly pressed into the facing side of the fastening zone and the corresponding upper face of the bearing element during the installation. Such plastic deformations, which likewise only occur near the surface, are also neglected.

It is advantageous that a tapered region is formed on the clamp, wherein said tapered region extends from the contact zone at least sectionally along a spring zone of the clamp, which is located directly adjacent to the contact zone. A constructive adaptation preferably is used in order to realize a division of the clamp into regions or zones, in which a plastic deformation takes place. For example, the material thickness in the fastening zone and the lateral zone may be greater than in a transition zone, the spring zone and the contact zone in this case. This may be realized additionally or alternatively to a constructive solution, in which the aforementioned tapered region extends from the contact zone to the spring zone. Furthermore, the tapered region may advantageously also extend into or even across a transition zone. Such constructive measures make it possible to specify defined regions or zones, in which deformations, particularly plastic deformations, take place when the clamp is connected to the bearing element in its fastening zone. In this case, the constructive design is chosen in such a way that local overloads, particularly the impairment of a desired elastic behavior, are prevented.

In this case, it is also advantageous if the clamp is realized with a lateral zone between the fastening zone and the spring zone, wherein the fastening zone and the lateral zone are in contrast to the spring zone at least in essence not deformed when the clamp is connected to the bearing element in its fastening zone. The lateral zone particularly makes it possible to realize a guidance of the rail foot. Since no deformation of the lateral zone takes place, the lateral zone is prevented from exerting an increased clamping force upon the rail foot, which would result in a corresponding increase of the frictional force during a desired length compensation. A suitable anti-friction agent, which is introduced, e.g., in the form of a lubricant during the installation, may be provided on the lateral zone in this case.

In this respect, it is furthermore advantageous that the clamp comprises a curved transition zone between the spring zone and a or the lateral zone and that the tapered region of the clamp at least sectionally extends from the spring zone to the lateral zone along the transition zone. In this way, a suitable constructive design of the clamp for the respective application can be realized in order to limit a desired plastic deformation to certain regions or zones when the clamp is fastened on the bearing element. However, measures other than the formation of a tapered region and/or the variation of a material thickness of the clamp along its different zones are also possible. It would be conceivable, for example, to form slots, openings, particularly bores, or the like in certain regions or zones in order to allow a plastic deformation at these locations when the clamp is fastened on the bearing element.

A design of the clamp in the form of an at least partially lug-shaped clamp is particularly advantageous for allowing the aforementioned plastic and elastic deformations, which vary in the individual regions or zones. In this case, the clamp preferably is realized in a lug-shaped manner in the region of its contact zone and at least in its spring zone. In this context, the design in the form of a lug-shaped clamp should be interpreted in such a way that, for example, a support region in the form of a rib or a dome may be additionally realized in the contact zone. In this way, a suitable support region particularly can be realized in the contact zone. For example, a punctiform or linear support of the clamp may thereby be specified on the bearing side on the upper face of the site part of the rail foot. Consequently, a punctiform or linear support on the bearing side can be advantageously specified in the contact zone of the clamp. In contrast to a linear support, a punctiform support should be interpreted as a support that is constructively defined by a point, e.g. a point on the surface of a hemisphere. However, slight deformations, which are typically unavoidable, may lead to a small-surface support on the constructively defined point in practical applications. Accordingly, a linear support is constructively defined by a line, e.g. on a semicylinder.

If a punctiform support on the bearing side is specified in the contact zone of the clamp, it is furthermore advantageous that the spacer is realized with a recess, wherein the spacer is mounted between the contact zone of the clamp and the bearing side on the upper face of the side part of the rail foot in such a way that the punctiform support is located in the recess of the spacer and spaced apart from the bearing side.

It is furthermore advantageous that the spacer is realized in the form of a tab-shaped spacer. A handle strip may be formed on the tab-shaped spacer in order to simplify the removal of the spacer after the plastic deformation of the clamp. In this case, the spacer can optionally also be removed without previously loosening a fastening screw or the like.

In an alternative design of the spacer, it is advantageous if the spacer comprises a stud bolt, wherein the spacer is screwed into a threaded bore extending through the contact zone of the clamp with its stud bolt in such a way that the mounting distance is specified. After the clamp has been fastened on the bearing element in its fastening zone, the stud bolt of the spacer can be at least partially unscrewed such that the contact zone of the clamp approaches the bearing side on the upper face of the side part.

Preferred exemplary embodiments of the invention are described in greater detail below with reference to the attached drawings.

DETAILED DESCRIPTION

Figure 1:
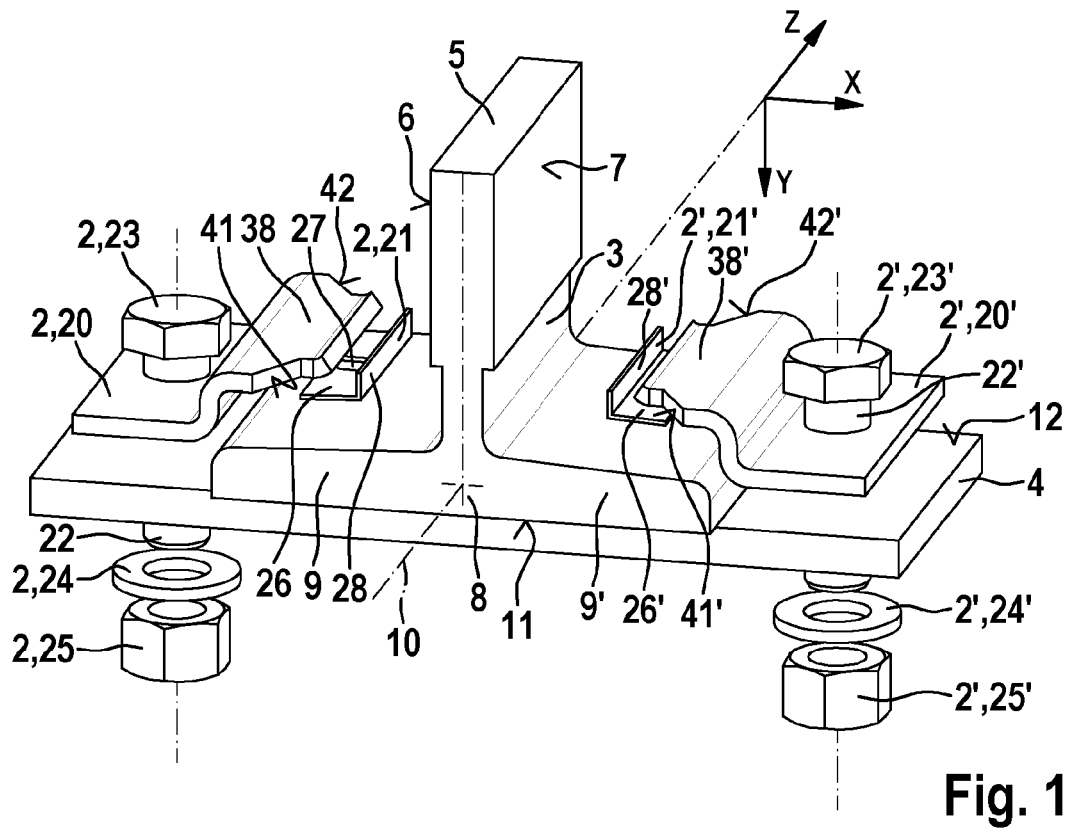
FIG. 1 shows a schematic three-dimensional representation of part of a rail of an elevator system, which is fastened on a bearing element according to a first exemplary embodiment of the invention by means of clamp sets, in order to elucidate a first exemplary embodiment of the invention.
Figure 4:
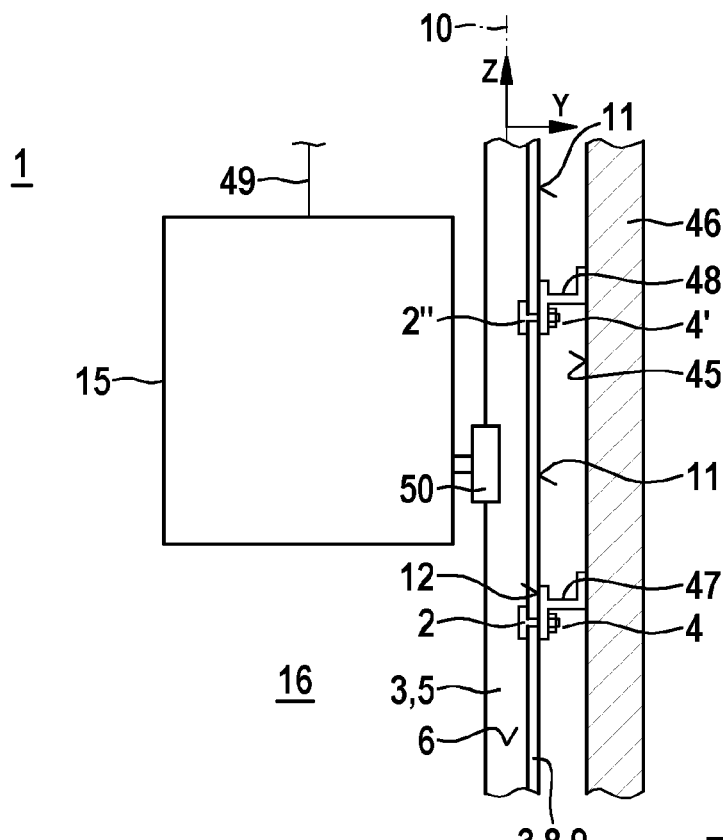
FIG. 4 shows a schematic representation of part of an elevator system, in which a rail is fastened in an elevator shaft in accordance with the first exemplary embodiment.

FIG. 1 shows a schematic three-dimensional representation of part of a rail 3 of an elevator system 1 (FIG. 4), which is fastened on a bearing element 4 by means of a clamp set 2 and a clamp set 2', in order to elucidate a first exemplary embodiment of the invention. The rail 3 comprises a rail head 5 with guide surfaces, 6, 7. The rail 3 furthermore comprises a rail foot 8 with side parts 9, 9'. The rail 3 extends through an elevator shaft 16 along its longitudinal direction 10 when the rail 3 is installed as illustrated in FIG. 4. In this case, a direction Z is defined along the longitudinal direction 10. During the installation, a bottom face 11 of the rail foot 8 is placed on an upper face 12 of the bearing element 4. A degree of freedom in a direction Y is limited by the upper face 12 in this case. A direction X remains with respect to a right-handed coordinate system.

In the fastened state, the rail 3 should be displaceable relative to the bearing element 4 in and opposite to the direction Z in order to allow a length compensation. For example, the rail 3 may be supported on a shaft bottom in this case. However, the rail 3 has to be fixed in and opposite to the direction X, as well as in and opposite to the direction Y, because external forces particularly act upon the rail head 5 on the guide surfaces 6, 7. For example, the rail 3 may then serve as a guide rail 3 for an elevator car 15 (FIG. 4) or a counterweight.

The clamp set 2 comprises a clamp 20 and a spacer 21. In this exemplary embodiment, the clamp 20 also comprises a screw 22 with a screw head 23, a washer 24 and a nut 25. The spacer 21 furthermore comprises a recess 27 on its spacer part 26 in this exemplary embodiment. The spacer 21 is also provided with a handle strip 28. The spacer 21 is realized in a tab-shaped manner.

The clamp set 2', which is likewise illustrated in this figure, accordingly comprises a clamp 20', a spacer 21', a screw 22' with a screw head 23', a washer 24' and a nut 25'. In addition, the spacer 21' is accordingly provided with a recess 27' (FIG. 2) in its spacer part 26', but said recess is concealed in FIG. 1. Furthermore, the spacer 21' is accordingly realized with a handle strip 28'.

In order to fasten the rail 3, the bearing element 4 initially is suitably positioned in the elevator shaft 16 as described in greater detail below with reference to FIG. 4. The upper face 12, which serves for directly attaching the rail foot 8 in this exemplary embodiment, therefore has a defined orientation in the elevator shaft 16. Subsequently, the rail foot 8 is fastened on the bearing element 4 by means of the clamp sets 2, 2'. In this case, additional clamp sets 2" and optionally additional bearing elements 4' may be used along the longitudinal direction 10 as illustrated in FIG. 4.

Figure 2:
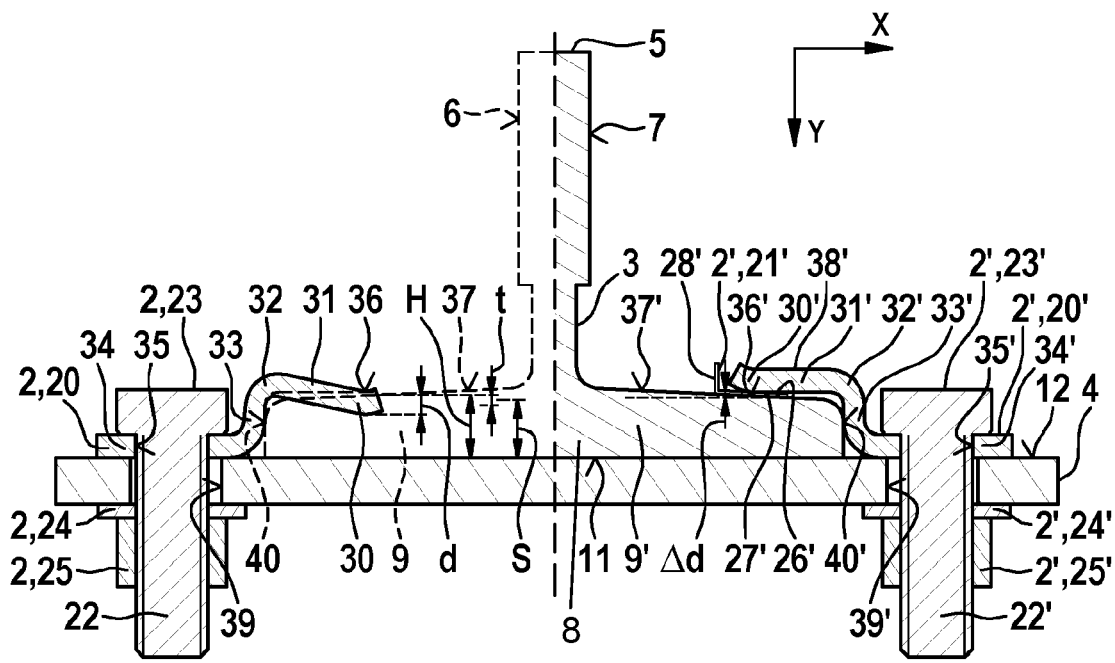
FIG. 2 shows a schematic sectional representation of the rail according to FIG. 1 during an installation in order to elucidate the first exemplary embodiment of the invention.

FIG. 2 shows a schematic sectional representation of the rail according to FIG. 1 during an installation in order to elucidate the first exemplary embodiment of the invention. In this case, the right side of FIG. 2 shows a situation during the installation, in which the spacer 21' is still located between a contact zone 30' of the clamp 20' and a bearing side 36' on an upper face 37' of the rail foot 8. The left side of FIG. 2 shows a fictitious situation, in which the clamp set 2 is installed and illustrated in a state, in which the rail 3 is theoretically omitted, i.e. without a rail foot 8. This serves for elucidating a constructive design of the clamp set 2 with respect to the rail foot 8 and the function of the proposed measures. In this respect, a fictitious position of the left half of the rail 3 is indicated with a broken line.

The clamp 20 comprises a contact zone 30, a spring zone 31, a transition zone 32, a lateral zone 33 and a fastening zone 34 with a bore 35. In this exemplary embodiment, a bearing side 36 corresponds to an upper face 37 of the rail foot 8 because no additional layer, e.g. an anti-friction layer, is installed between the contact zone 30 of the clamp 20 and the upper face 37 of the rail foot 8. A holding dimension H is specified in the contact zone 30 of the clamp 20 due to the geometry of the rail foot 8. In this case, the holding dimension H is defined as the distance between a support point or a support line of the contact zone 30 on the bearing side 36 and the upper face 12 of the bearing element 4 or the bottom face 11 of the rail foot 8, respectively. The holding dimension H may deviate from a nominal holding dimension S due to manufacturing tolerances or the like. In this respect, the nominal holding dimension S may have a tolerance range t.

Based on the constructive design of the clamp illustrated on the left side of FIG. 2, the contact zone 30 of the clamp 20 has to be adjusted by an adjustment travel d in order to reach the holding dimension H. This means that the clamp 20 is expanded during the installation, wherein an elastic deformation and optionally also a plastic deformation of the clamp 20 takes place.

According to the illustration on the right side of FIG. 2, the spacer 21' has at least at the relevant location a thickness Δd, which causes an additional adjustment travel Δd when the spacer 21' is installed. This means that the clamp 20' is additionally expanded beyond the holding dimension H, namely by the additional adjustment travel Δd. In this case, plastic deformations of the clamp 20' take place over the additional adjustment travel Δd.

The additional adjustment travel Δd is specified by the spacer 21 as the mounting distance Δd between the contact zone 30 of the clamp 20 and the bearing side 36 on the upper face 37 of the rail foot 8.

In accordance with the clamp 20, the clamp 20' also comprises a spring zone 31', a transition zone 32', a lateral zone 33' and a fastening zone 34' with a bore 35'.

Plastic deformations of the clamps 20, 20' preferably take place at least in essence in the region of the spring zones 31, 31' and optionally also in the region of the transition zones 32, 32'. However, at least no significant deformations of the clamps 20, 20' occur in the lateral zones 33, 33' and the fastening zones 34, 34'. To this end, the clamps 20, 20' are in this exemplary embodiment provided with tapered regions 38, 38', wherein a taper 41, 42, 41', 42' is respectively provided on both sides. As a result, plastic deformations essentially take place in the spring zones 31, 31'.

In this exemplary embodiment, the bearing element 4 has through-openings 39, 39', which allow a play in and opposite to the direction X when the clamps 20, 20' are fastened by means of the screws 22, 22'. In this way, the lateral zones 33, 33' can be brought in contact with longitudinal sides 40, 40' of the rail foot 8 in order to realize a guidance of the rail foot 8. A degree of freedom in and opposite to the direction X can thereby be advantageously limited. The degree of freedom opposite to the direction Y is advantageously also limited by the clamps 20, 20'.

FIG. 2 also shows a nominal holding dimension S and its tolerance range t for the rail foot 8. In this case, the nominal holding dimension S and the tolerance range t are illustrated without regard to realistic proportions. The exemplary holding dimension H chosen for the rail foot 8 in this figure may in extreme instances lie at the upper end of the tolerance range t for the nominal holding dimension S.

Figure 3:
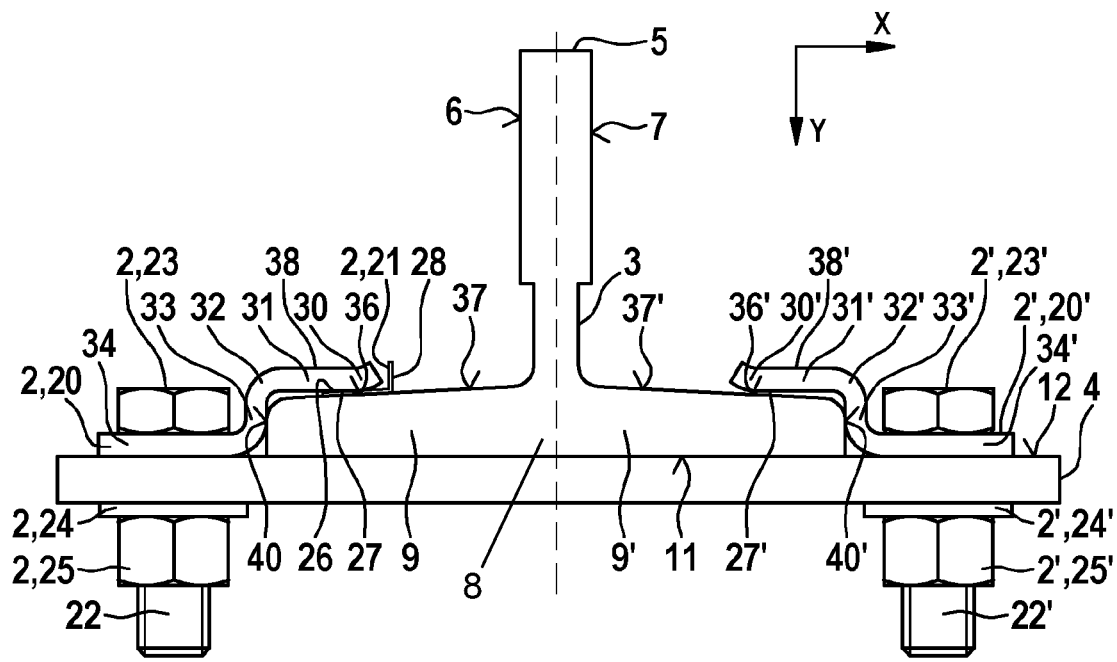
FIG. 3 shows a schematic representation of the rail according to FIG. 1 in the installed state in order to elucidate the first exemplary embodiment of the invention.

FIG. 3 shows a schematic sectional representation of the rail according to FIG. 1 during an installation in order to elucidate the first exemplary embodiment of the invention. In contrast to FIG. 2, the rail 3 is now also provided and illustrated in the left half such that this rail is fastened on the bearing element 4 on both sides by means of the clamp sets 2, 2'. However, the left side and the right side of FIG. 3 show two different potential embodiments of the fastening arrangement. The left side of FIG. 3 shows an embodiment, in which the spacer 21 also remains between the bearing side 36 on the upper face 37 of the rail foot 8 and the contact zone 30 of the clamp 20 after the installation. In this case, the spacer 21 is made of a material that has a creep behavior during the operation. In addition, the material of the spacer 21 is chosen such that the friction is reduced. During the operation, the contact zone 30 of the clamp 20 approaches the bearing side 36 on the upper face 37 of the rail foot 8 because the material of the spacer 21 loses its bearing capacity as a result of the pressure exerted by the clamp 20 and is compressed. A distance between the contact zone 30 and the bearing side 36 is initially specified by the mounting distance Δd. In the installed state of the elevator system 1, this distance is reduced over time until it at least in essence disappears and ideally assumes a value equal to zero or at least close to zero, i.e. a value of a few percent of its initial value.

In the embodiment illustrated on the right side of FIG. 3, the spacer 21' is removed after the installation. In this case, the contact zone 30' of the clamp 20' directly abuts on the bearing side 36' or in this case the upper face 37' of the rail foot 8 when the elevator system 1 is commissioned or recommissioned.

In both embodiments, the additional adjustment travel Δd disappears at least over the course of time such that the adjustment travel d ultimately remains. Depending on the design of the rail 3, the adjustment travel d then lies between the values $d_{min}$ and $d_{max}$ in a stochastically distributed manner.

FIG. 4 shows a schematic representation of part of the elevator system 1, in which the rail is fastened in the elevator shaft 16 in accordance with the first exemplary embodiment. In this exemplary embodiment, the elevator shaft 16 is defined by a shaft wall 45 of a building 46. The bearing elements 4, 4' form parts of fastening structures 47, 48, which are suitably connected to the shaft wall 45 of the building 46, in this exemplary embodiment. The bearing elements 4, 4' are therefore arranged in the elevator shaft 16 in a fixed manner. During the installation, the rail 3 can be fastened on the bearing elements 4, 4' by means of the clamp sets 2, 2', 2". In the fastened state, the degrees of freedom of the rail 3 in and opposite to the direction Y, as well as in and opposite to the direction X, are limited. However, the fastening arrangement allows the rail 3 to yield in and opposite to the direction Z. For example, the rail 3 can yield on the bearing elements 4, 4' along its longitudinal direction 10 if a relative length change between the rail 3 and the building 46 occurs during the operation due to settling of the building. Among other things, this makes it possible to prevent the rail 3 from bending due to high mechanical stresses.

The elevator car 15 shown may be suspended in the elevator shaft 16, for example, with the aid of a carrying means 49. The required guidance of the elevator car 15 during its operation can then be realized, among other things, by means of a guide element 50 such as a guide roller or guide shoe, which is arranged on the guide surface 6 of the rail 3. In this case, forces acting in the direction X and optionally in the direction Y can be advantageously absorbed by the clamps, 20, 20' of the clamp sets 2, 2' and the bearing element 4, as well as additional clamp sets 2"' and bearing element 4'.

Figure 5:
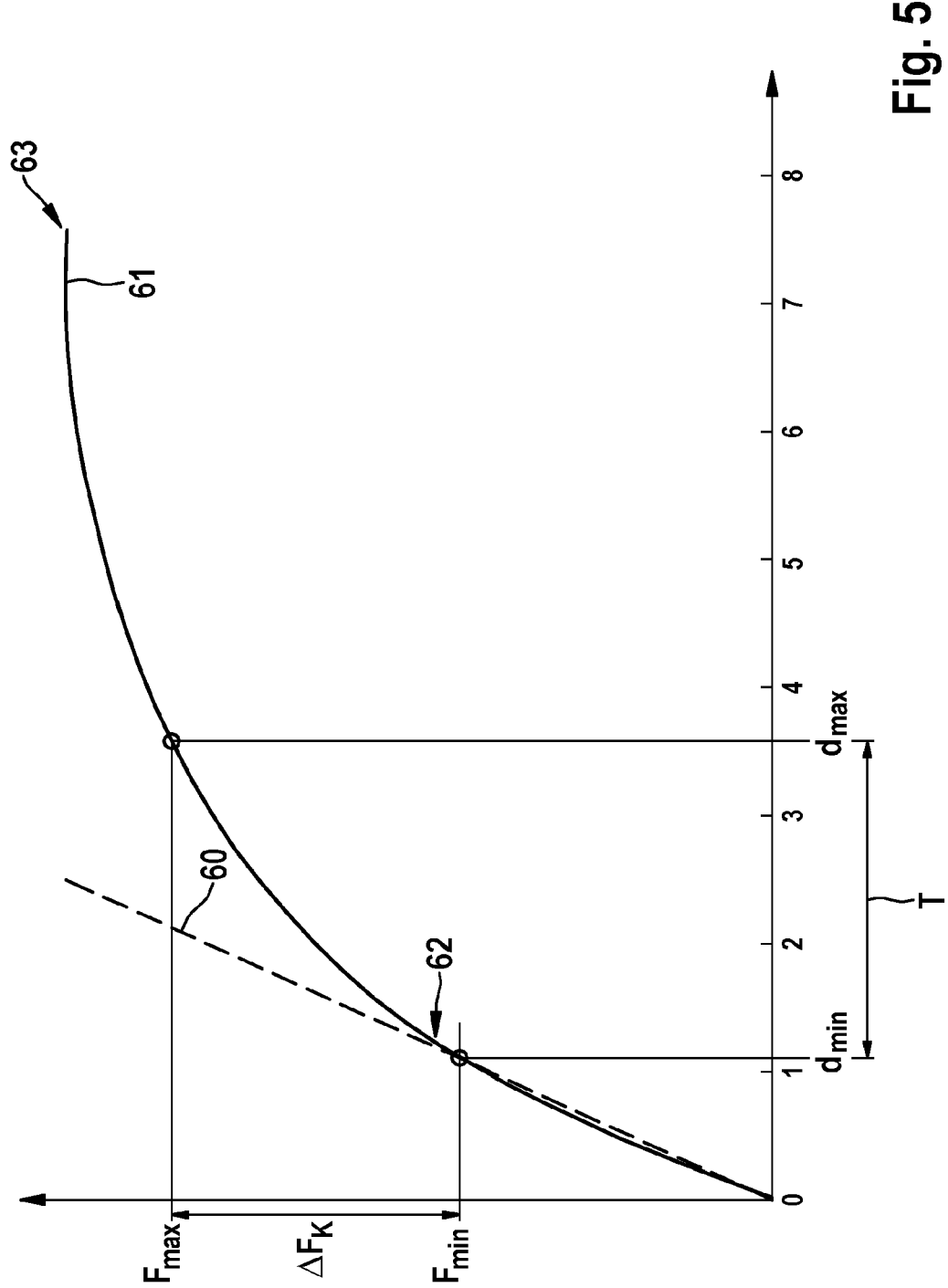
FIG. 5 and FIG. 6 show diagrams in order to elucidate the function of a potential embodiment of the invention.
Figure 6:
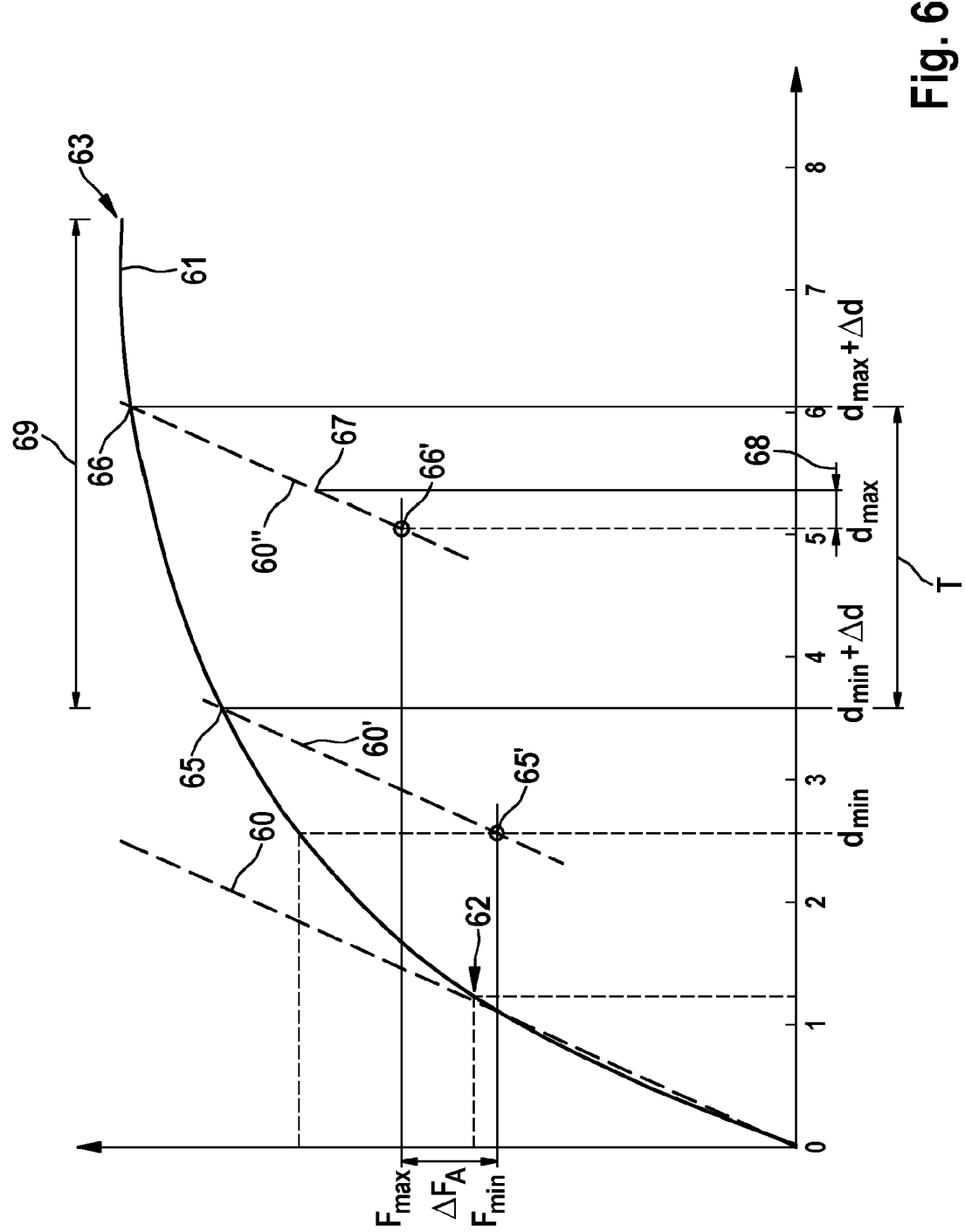

FIGS. 5 and 6 show diagrams for elucidating the function of a potential embodiment of the invention with respect to an individual clamp set 2 that, however, is also respectively adapted for a minimal clamping force $F_{min}$ if the spacer 21 is removed during the installation. In this case, an installation without a spacer 21 is described with reference to FIG. 5. In contrast, the effect of an installation of the spacer 21 during the fastening process and a subsequent removal of the spacer 21 is illustrated in FIG. 6.

In the diagrams, an adjustment travel is plotted on the abscissae in mm units. Furthermore, the respectively adjusted clamping force of the clamp 20 is plotted on the ordinates in the diagrams. It goes without saying that the indicated and described values merely serve for elucidating a preferred embodiment and should not be interpreted in a restrictive sense.

A spring characteristic 60 is illustrated in the diagrams in the form of a broken line 60. The spring characteristic 60 describes an elastic behavior of the clamp 20. A characteristic deformation curve 61 of the clamp increasingly deviates from the spring characteristic 60 starting at about a point 62. In contrast to the spring characteristic 60, along which a force increase during a small, particularly infinitesimal, change of the adjustment travel is not dependent on the already occurred adjustment travel, such a force increase continuously decreases in the relevant range along the deformation curve 61 as the already occurred adjustment travel increases. In this example, the relevant range maximally extends up to a point 63 because adjustment travels beyond this point are no longer relevant.

Consequently, the deformation curve 61 has a flat region 69 (FIG. 6), in which the deformation curve extends flatly relative to the spring characteristic 60. In this case, the flat region 69 ends at a point 63. The flat region furthermore begins to the right of the point 62.

A minimal adjustment travel $d_{min}$ and a maximal adjustment travel $d_{max}$ are relevant for the function of the clamp 20. These adjustment travels result from a tolerance range T and from a minimally required force $F_{min}$. The tolerance range T includes at least the tolerance range t for the nominal holding dimension S. The tolerance range t therefore results, for example, from manufacturing tolerances during the manufacture of the rail 3. The tolerance range T may also include a manufacturing tolerance of the clamp 20. If one or more intermediate layers, anti-friction layers, supports or the like are provided, the corresponding tolerances may also be taken into account in the tolerance range T. In a suitable embodiment, which in FIG. 5 does not take into account the function of the spacer 21, the minimal adjustment travel $d_{min}$ results from the minimally required clamping force $F_{min}$. In this exemplary embodiment, the deformation curve 61 does not continue up to the point 62 such that a purely elastic deformation of the clamp 20 essentially takes place. The tolerance range T results in the maximal adjustment travel $d_{max}$, over which the clamp 20 can be expanded. A maximal clamping force $F_{max}$ occurs in this case.

A force difference $\Delta F_K$ results between the maximal clamping force $F_{max}$ and the minimal clamping force $F_{min}$. This force difference $\Delta F_K$ is the force difference if only the clamp 20 without a spacer 21 is installed in a corresponding embodiment of the clamp 20.

An adjustment travel d (FIG. 2), which lies between the minimal adjustment travel $d_{min}$ and the maximal adjustment travel $d_{max}$, results if the clamp 20 is installed without a spacer 21. In this context, it is important that the clamping force resulting during the installation may due to tolerances increase from the specified clamping force $F_{min}$ to a maximal value $F_{max}$ such that the clamping force being adjusted in the concrete application can vary over a range $\Delta F_K$. In this case, the maximal clamping force $F_{max}$ already may be undesirably high. For example, the high clamping force $F_{max}$ may have disadvantageous effects on the desired length compensation because it generates high frictional forces.

For example, the tolerance range T can be determined as follows. The tolerance range t for the nominal holding dimension S resulting from manufacturing-related tolerances during the manufacture of the rail 3 may amount, e.g., to 1.5 mm, which corresponds to a manufacturing tolerance of +/−0.75 mm. The clamp 20 may have a manufacturing tolerance of +/−0.5 mm, i.e. an overall tolerance range of 1 mm. The total tolerance range T then amounts to 2.5 mm.

According to FIG. 6, the use of the spacer 21 results in an additional adjustment travel Δd that is added to the adjustment travel d, wherein the adjustment travel d lies between the minimal adjustment travel $d_{min}$ and the maximal adjustment travel $d_{max}$ in this case. In this way, the curve 61 is traversed at least up to a point 65 and maximally up to a point 66. A plastic deformation and an elastic deformation of the clamp 20 already take place at the point 65. The final state at the point 65' results after the removal of the spacer 21. A spring characteristic 60' extending parallel to the spring characteristic 60 is traversed in order to reach the point 65'. In this case, the parallel shift results from the plastic deformation.

Starting from the point 66, the final state accordingly results at the point 66', wherein a spring characteristic 60" extending parallel to the spring characteristic 60 is traversed.

The minimal clamping force $F_{min}$ of the clamp 20 occurs at the point 65'. The maximal clamping force $F_{max}$ of the clamp 20 then occurs at the point 66'. A clamping force in the range between the minimal clamping force $F_{min}$ and the maximal clamping force $F_{max}$ is then adjusted in practical applications. The force difference $\Delta F_A$ between the maximal clamping force $F_{max}$ and the minimal clamping force $F_{min}$ defines the magnitude $\Delta F_A$ of this range.

In practical applications, the minimal adjustment travel $d_{min}$ is specified by the constructive design of the clamp 20 in such a way that the minimal clamping force $F_{min}$ is not lower than a required clamping force after the removal of the spacer 21. For example, the left side of FIG. 2 shows a constructive design of the clamp 20, which allows a correspondingly high deformation of the clamp 20 with a significant plastic deformation component during the installation. However, load limits have to be taken into account in this case. This is achieved by specifying a point 63 that is not exceeded by the upper limit of the adjustment travel plotted along the abscissa, which is defined by the point 66.

In contrast to the embodiment described with reference to FIG. 5, the embodiment described with reference to FIG. 6 provides the particular advantage that the range $\Delta F_A$ is smaller, particularly much smaller, than the range $\Delta F_K$ being adjusted for the clamping force of the clamp 20. In the embodiment described with reference to FIG. 6, a certain tolerance range (total tolerance range) T therefore leads to a smaller variation range $\Delta F_A$ of the clamping force.

Since the deformation curve 61 becomes increasingly flatter as the adjustment travel d increases, the magnitude of the range $\Delta F_A$ can be tendentially reduced by shifting the points 65, 66 in the direction of the point 63. This is the reason why the point 65 preferably is located in the flat region 69 of the deformation curve 61, in which the deformation curve 61 already extends flatly relative to the spring characteristic 60.

According to FIG. 6, the minimal adjustment travel $d_{min}$ and the maximal adjustment travel $d_{max}$ are shifted toward the right along the abscissa by the additional adjustment travel $\Delta d$, which is defined by the thickness $\Delta d$ of the spacer 21. In a manner of speaking, the tolerance range T is in this case shifted toward the right into the flat region 69, but its magnitude remains unchanged.

FIG. 6 furthermore shows an exemplary situation for a modified embodiment, in which the spacer 21 remains installed, but has a creep behavior. As an example, the situation on the upper end of the tolerance range T is examined. The clamp 20 initially is in a state that is defined by the point 66. The current state gradually traverses leftward/downward along the spring characteristic 60". After some time, for example, a point 67 is traversed, at which a distance 68 between the contact zone 30 of the clamp 20 and the bearing side 36 on the upper face 37 of the side part 9 of the rail foot 8 is reduced relative to the mounting distance $\Delta d$.

Since the rail-individual starting point lies between the points 65 and 66 on the deformation curve 61 in a stochastically distributed manner in accordance with the tolerance range T, the respective situation results from a parallel shift of the spring characteristic 60" in the direction of the spring characteristic 60'.

According to another modification, the spacer 21 may also consist of multiple parts, particularly multiple layers. This makes it possible to partially remove the spacer 21, which may act in a friction-reducing manner, such that a situation indicated by the point 67, in which the distance 68 between the contact zone 30 of the clamp 20 and the bearing side 36 on the upper face 37 of the side part 9 of the rail foot 8 is reduced relative to the mounting distance $\Delta d$, may already occur prior to the commissioning or recommissioning of the elevator system 1.

Figure 7:
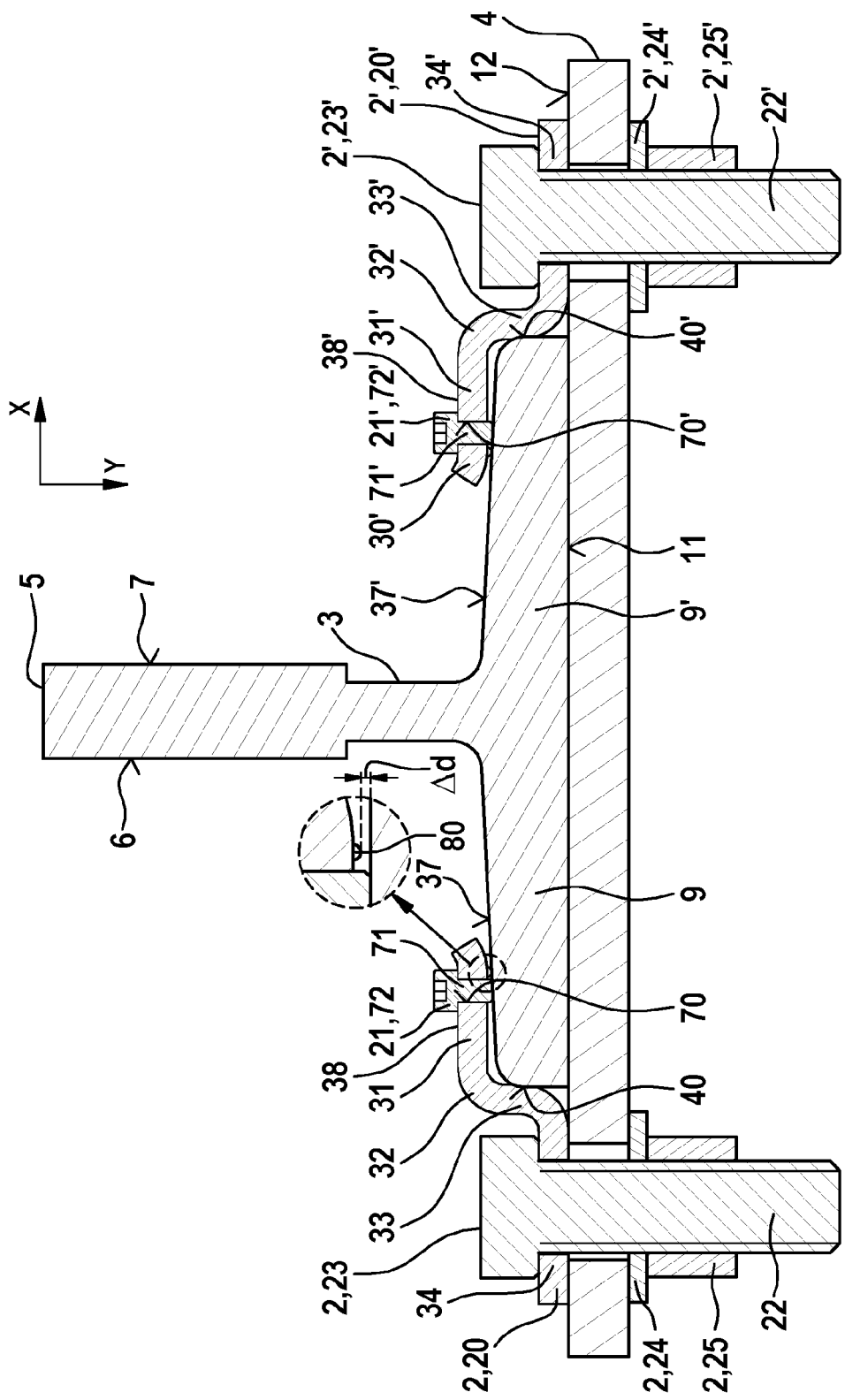
FIG. 7 shows a second exemplary embodiment of the invention in the form of a schematic sectional representation according to FIG. 2.

FIG. 7 shows a schematic sectional representation of the rail 3 according to FIG. 2, which is fastened on the bearing element 4 by means of the clamp sets 2, 2' in accordance with a second exemplary embodiment. In this exemplary embodiment, the clamp 20 contains a threaded bore 70, into which a stud bolt 71 of a screw 72 is screwed. In this case, the stud bolt 71 is realized in such a way that the additional adjustment travel $\Delta d$ is adjusted as the mounting distance $\Delta d$ when the screw 72 is completely screwed into the clamp 20. The screw 72 therefore serves as the spacer 21. An elastic deformation and a plastic deformation of the clamp 20 then take place during the installation.

Accordingly, a threaded bore 70' is provided in the clamp 20', wherein a stud bolt 71' of a screw 72', which accordingly serves as spacer 21', is screwed into said threaded bore. Corresponding advantages with respect to a reduced force difference $\Delta F_A$ are therefore realized on the clamps 20, 20' analogous to the first exemplary embodiment.

The contact zone of the clamp 20 may be provided with a support 80, on which the clamp 20 abuts during the operation, i.e. after the removal of the spacer 21. In this case, the support 80 may be realized in the form of a punctiform support 80. In a modified embodiment, the support 80 may also be realized in the form of a linear support 80, which preferably extends along the direction Z or coaxial to the longitudinal direction 10 of the rail 3, respectively. Such a support 80, particularly a punctiform or linear support 80, may also be realized accordingly in the first exemplary embodiment.

The invention is not limited to the described exemplary embodiments. For example, the spacer could also be realized in a wedge-shaped manner.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for fastening a rail of an elevator system on a bearing element fixed in an elevator shaft utilizing a clamp set, the method comprising the steps of:

providing the clamp set including a clamp and a spacer;

arranging the clamp on a side part of a rail foot of the rail, the side part being arranged on the bearing element wherein the clamp can be connected to the bearing element in a fastening zone of the clamp and a contact zone of the clamp is arranged on a bearing side on an upper face of the side part of the rail foot, wherein a mounting distance between the contact zone of the clamp and the bearing side on the upper face of the side part of the rail foot is specified by the spacer such that the clamp is in part elastically deformed and in part plastically deformed when the clamp is connected to the bearing element in the fastening zone; and removing the spacer after connecting the clamp to the bearing element in the fastening zone and prior to a commissioning or a recommissioning of the elevator system.

2. The method according to claim 1 including determining a tolerance range for a nominal holding dimension between the bearing side on the upper face of the side part and the bearing element for the side part of the rail foot, and wherein the mounting distance specified by the spacer shifts a total tolerance range that includes the tolerance range for the nominal holding dimension into a region of a deformation curve of the clamp that extends flatly relative to a spring characteristic of the clamp.

3. The method according to claim 2 wherein the tolerance range for the nominal holding dimension is determined from one of a constructively specified and/or empirically determined tolerance range for the side part of the rail foot and a constructively specified and/or empirically determined tolerance range between the bearing side on the upper face of the side part of the rail foot and the upper face of the side part of the rail foot.

4. The method according to claim 1 wherein the total tolerance range includes at least the tolerance range for the nominal holding dimension and a manufacturing tolerance of the clamp.

5. The method according to claim 1 wherein the bearing side is the upper face of the side part of the rail foot or an anti-friction layer arranged on the upper face of the side part of the rail foot.

6. The method according to claim 1 including removing the spacer immediately after connecting the clamp to the bearing element in the fastening zone.

7. The method according to claim 1 wherein the clamp has a tapered region that extends from the contact zone at least sectionally along a spring zone of the clamp located directly adjacent to the contact zone.

8. The method according to claim 7 wherein the clamp has a lateral zone between the fastening zone and the spring zone, and wherein the fastening zone and the lateral zone are not deformed when the clamp is connected to the bearing element in the fastening zone.

9. The method according to claim 8 wherein the clamp has a curved transition zone between the spring zone and the lateral zone, and wherein the tapered region extends from the spring zone to the lateral zone along the transition zone.

10. The method according to claim 1 wherein the clamp has a punctiform support on the bearing side in the contact zone, the spacer has a recess, and the spacer is mounted between the contact zone and the bearing side on the upper face of the side part of the rail foot such that the punctiform support is located in the recess of the spacer and is spaced apart from the bearing side.

11. The method according to claim 1 wherein the spacer is tab-shaped with a handle strip.

12. The method according to claim 1 wherein the spacer is a stud bolt that is screwed into a threaded bore extending through the contact zone of the clamp to specify the mounting distance.

* * * * *